(12) United States Patent
Espe et al.

(10) Patent No.: US 9,446,622 B2
(45) Date of Patent: Sep. 20, 2016

(54) METHOD AND DEVICE FOR PRODUCING A SURFACE STRUCTURE FOR A METALLIC PRESS PLATE, ENDLESS BELT OR EMBOSSING ROLLER

(75) Inventors: Oliver Espe, Bochum (DE); Rolf Espe, Bochum (DE)

(73) Assignee: Hueck Rheinische GmbH, Viersen (DE)

(*) Notice: Subject to any disclaimer, the term of this patent is extended or adjusted under 35 U.S.C. 154(b) by 786 days.

(21) Appl. No.: 12/807,066

(22) Filed: Aug. 26, 2010

(65) Prior Publication Data
US 2011/0048254 A1    Mar. 3, 2011

(30) Foreign Application Priority Data
Aug. 26, 2009   (EP) ..................................... 09010921

(51) Int. Cl.
| | |
|---|---|
| *B30B 5/04* | (2006.01) |
| *B44C 1/22* | (2006.01) |
| *B23K 26/00* | (2014.01) |
| *B23K 26/08* | (2014.01) |
| *B44B 5/02* | (2006.01) |
| *B23K 26/36* | (2014.01) |

(52) U.S. Cl.
CPC ........... *B44C 1/228* (2013.01); *B23K 26/0084* (2013.01); *B23K 26/0884* (2013.01); *B23K 26/362* (2013.01); *B44B 5/026* (2013.01)

(58) Field of Classification Search
USPC ..................................................... 700/97, 166
See application file for complete search history.

(56) References Cited

U.S. PATENT DOCUMENTS

| | | | |
|---|---|---|---|
| 4,987,443 A * | 1/1991 | Sawyer et al. .................. 355/85 |
| 5,124,524 A * | 6/1992 | Schuster et al. ......... 219/121.78 |
| 5,650,614 A * | 7/1997 | Yasutake et al. ............. 250/234 |
| 5,880,430 A * | 3/1999 | Wein ........................ 219/121.69 |
| 5,916,461 A * | 6/1999 | Costin et al. ............ 219/121.68 |
| 6,617,543 B1 * | 9/2003 | Yang ........................ 219/121.69 |
| 7,833,617 B2 * | 11/2010 | Kliesch et al. ............... 428/216 |
| 2003/0183603 A1 * | 10/2003 | Forsman et al. ........... 219/121.6 |
| 2003/0189730 A1 * | 10/2003 | Enomoto ..................... 358/3.26 |
| 2007/0296203 A1 * | 12/2007 | Golan ............................ 283/72 |
| 2008/0074760 A1 * | 3/2008 | Sato ............................. 359/784 |
| 2008/0259970 A1 * | 10/2008 | Vogler ............................. 372/6 |

* cited by examiner

*Primary Examiner* — Carlos Ortiz Rodriguez
(74) *Attorney, Agent, or Firm* — Michael Soderman

(57) ABSTRACT

A method for producing a surface structure for a metallic press plate, endless belt or a cylindrical embossing roller through at least one laser and a device for using the method. In order to provide a cost effective production for the surface structure while using environmentally friendly techniques, it is proposed to use a laser which produces the entire surface structure through partial removal of a surface of a metallic press plate, endless belt or embossing roller to be processed. Thus, the laser is controlled by a provided 3D topography, wherein control of the laser is performed through obtained x, y and z coordinates in order to produce a depth structure, so that high portions and low portions are formed.

23 Claims, 4 Drawing Sheets

METHOD AND DEVICE FOR PRODUCING A SURFACE STRUCTURE FOR A METALLIC PRESS PLATE, ENDLESS BELT OR EMBOSSING ROLLER

RELATED APPLICATIONS

This patent application claims priority from and incorporates by reference European patent application 09 010 921.6 filed on Aug. 26, 2009.

FIELD OF THE INVENTION

The invention relates to a method for producing a surface structure for a metal press plate, endless belt or cylindrical embossing roller using at least one laser. The invention also relates to a device for performing the method.

BACKGROUND OF THE INVENTION

Press plates or endless belts are being used for producing material sheets, for example wood material sheets, which are provided with a respective decorative design. Alternative applications can be found in the production of laminate panels or laminate floor plates. The material sheets employed include a core made from MDF or HDF, wherein different material layers are applied at least on one side, wherein the material layers can included for example a decorative layer and a protective overlay layer. In order to prevent warping of the material sheets used, typically the backside is also provided with respective material layers, so that the material sheet can be pressed together in a press using press plates or endless belts. Advantageously, hot presses are used for this purpose, since the different applied material layers are impregnated with duro-plastic resins, for example melamine resin, and thus melt together with the surface of the core under heat impact. Thus, the employed decorative layers can be structured, wherein for example a wood or tile décor can be embossed, or structures are being used that have an artistic design corresponding to the respective application. In order to improve a natural reproduction, in particular for wood decors, tile decors or natural stone surfaces, and for obtaining particular gloss grades, press plates and endless belts are being used, which include a negative image of the provided structure. The quality of the material sheets produced with a decorative layer and an embossed pattern thus achieves high precision based on digitized printing techniques and digitized production of the press plate surfaces, wherein the precision comes very close to natural wood panels or comparable materials due to the precise alignment. Adjusting a particular gloss grade furthermore provides the option to generate reflections or shadings which convey an impression of a natural wood surface or an impression of other materials to a user.

In order to achieve the result recited supra, the quality requirements for the production of the press plates, endless belts and cylindrical embossing rollers are high, which facilitates in particular precision fabrication with the provided decorative layers. The press plates and endless belts are thus being used as top tools and bottom tools in quick cycle presses, which are provided with press plates or double band presses, which are provided with endless belts, wherein the embossing and heating of the material layers is performed simultaneously, so that the duro-plastic resins are connected with the core through melting and hardening. The embossing rollers, on the other hand, are rolled over the surface of a material sheet and are also being used for structuring.

Methods are known in the art for producing the press plates, endless belts or embossing rollers, wherein the methods provide an application of an etching resistant layer with a respective structure onto a pretreated metallic surface, a subsequent etching process in order to generate a first structure on the surface through an etching process, and subsequent removal of the etching resistant layer. Depending on the desired surface quality, this etching process can be repeated several times in sequence, so that a particularly high penetration depth into the surface of the press plate or of the endless belts can be achieved, and additionally a coarse and fine structuring can be achieved that provides the desired structure layout. Thus, a mask is applied through a silk screening method to a pretreated plate after cleaning has been performed, and the desired surface structure is generated through subsequent etching, wherein the silk screening is applied to the large format plates and the plates are subsequently etched on their entire surfaces. All portions which form the high surface structures are thus covered through the applied mask, so that surface etching can only be performed in the portions which are directly exposed to the etching liquid. The etched out portions then form the profile depressions of the desired structure. After the etching has been performed, the surface is cleaned and in particular the mask removed, so that the surface treatment can continue and the surface can be subjected to another finishing process, for example hard chroming.

Alternatively, there is the option to use a photographic method, in which initially a photosensitive layer is applied to the entire surface. The photosensitive layer subsequently has to be exposed according to the provided mask in order to create the surface structure. Thereafter, the photosensitive layer needs to be developed. In between, numerous flushing processes have to be performed, so that the surface can be prepared and cleaned for the subsequent process steps. After the development of the photosensitive layer, this creates a mask which is also designated as etching template or etching resistant layer. The reproducibility of the masks produced in this manner is problematic, because the negative or positive image always has to be positioned in an exactly identical position relative to the photosensitive layer in order to expose the light sensitive layer, when more than one exposing and etching process shall be performed after the other, in order to thus apply complex 3D structures to the surface of a press plate or endless belt. This is problematic in particular when the negative or positive image is directly applied to the light sensitive layer in order to expose the light sensitive layer, and the negative or positive image does not have exactly the same distance at each position of the photosensitive layer. The reproducibility of applying the mask required for obtaining high imaging precision is thus not always assured, in particular for a photographic method. Additional problems can be created when a 3D structure shall be achieved through plural exposing and etching processes required in sequence, and thus plural masks have to be applied for this purpose after one another in sequence, wherein an etching process is performed between each mask application. Through the precise positioning and the required number of respective masks, thus the production of the press plates or of the endless belts is very complex and expensive. The resolution of the surface structure thus is highly dependent on the mask to be applied and dependent on the method employed, and furthermore uses a substantial number of process steps, wherein complex handling is used in particular due to the size of the press plates or of the endless belts.

Lately, the masks have been applied to the press plate directly, for example with an inkjet printer instead of a photographic method or a silk screening method, wherein digitized data is being used. This measure assures that an exact and precise image can be applied several times onto the same surface portions, so that a particularly deep structuring, this means etching of the surface can be performed. However, also for this method, numerous etching processes are used, which are detrimental to the environment.

BRIEF SUMMARY OF THE INVENTION

Thus, it is an object of the present invention to provide a new method for treating the surface of press plates and endless belts, which use environmental friendly techniques.

According to the invention, a method is provided which uses a laser for creating a surface structure of a metallic press plate, an endless belt or a cylindrical embossing roller, the method comprising the following steps:

providing and using digitized data of a three dimensional (3D) topography of a captured surface structure;
using the digitized data for position control of at least one laser in a plane defined by an x-coordinate and y-coordinate;
using a z-coordinate for focusing the at least one laser beam; and
partial removal of the surface through the at least one laser beam for reproducing a predeterminable surface structure.

Other advantageous embodiments of the invention can be derived from the following taken individually or in any combination or permutation with each other:

using plural lasers for processing in a first coordinate direction in the plane and moving the plural lasers jointly in a second coordinate direction;
focusing the at least one laser beam at a depth of up to 250 µm relative to the surface;
adjusting the focus of the at least one laser as a function of a distance change between the surface and laser optics;
the at least one laser beam impacting the surface at an angle relative to vertical (z-coordinate);
focusing the laser beam to a diameter of 2 to 10 µm;
using a fiber laser with an energy of 5 to 500 W, advantageously to 10 to 100 W, and more advantageously 20 to 40 W;
using a pulsed fiber laser with a power of 20 to 40 W, a wave length of 532 to 1064 nm and a pulse energy of 1 mJ at a pulse duration of 100 ns and a repeat frequency of 20 to 80 kHz;
using a laser assembly including a laser, a beam spreader and a focusing device (laser optics);
reducing the energy of the lasers through a laser power reducer;
disposing the focusing device at a distance of 10 to 100 cm from the surface; dividing the surface structure into portions irrespective of a repeat pattern, wherein the portions are respectively sequentially processed by a laser or at least partially processed by plural lasers in parallel;
freely selecting the boundaries of the portions, advantageously defining them so that the boundaries coincide with areas of the surface not to be processed;
the predetermined portions having an edge length of 10 to 800 cm, advantageously 50 to 500 cm as a function of the laser employed;
the predetermined portions being processed with a laser and associated laser optics;
measurement points being provided on the surface which facilitate a control of the position of the laser- and/or focusing device at any time, so that corrective control can be performed;
using digitized data of surface structures which replicates surfaces of naturally grown raw materials like e.g. wood or surfaces of natural minerals, in particular natural stone or surfaces of artificially produced structures e.g. ceramic surfaces;
using a 3D-scanner to capture digitized data, wherein the 3D-scanner detects the entire surface of an original accurately through deflectable mirrors or detects it through scanning the entire surface structure with a laser beam deflected by at least one mirror and by detecting the reflections thus obtained, or by using grey scale images of a surface structure for computing digitized data for defining a 3D-topography;
converting the detected digital data, in particular through interpolation and data reduction for controlling the laser optics;
a support device for the materials to be processed, at least one laser with a beams spreader and a focusing device, and a slide support for moving a laser assembly into any position within a plane defined by a x-coordinate and a y-coordinate, and independent drive elements for moving to a position, and a control unit provided for moving laser optics to a position and focusing the laser optics;
one or plural laser assemblies (114) including a laser with a beam spreader and a focusing device, wherein the one or plural laser assemblies is/are arranged in a first coordinate direction in a plane and are jointly movable in a second coordinate direction in the plane;
a focusing device disposed at a distance of 10 to 100 cm from the surface and detecting a an area with an edge length of 10 to 800 cm, advantageously 50 to 500 cm;
the support device includes a flat planar surface (103) which is divided into plural partial surfaces and which includes suction openings within the partial surfaces for a vacuum suction device; and
using the method to forming a structured surface.

Differently from the techniques used so far, the press plates, endless belts and embossing rollers are structured through a laser, wherein the laser directly generates the surface structure to be obtained through partial removal of the surface. This method has many advantages. Initially it is appreciated that this method facilitates omitting an etching process, unless a post-etching is desirable for rounding the edges after the surface structure has been produced through a laser.

Furthermore, a laser beam can be exactly controlled through digitized data, so that an almost identical reproduction of the surface structure can be performed over and over again. Thus, it is only required to provide digitized data of a 3D-topography, wherein the digitized data represents the captured surface structure. The data provided is then used for controlling the laser and/or a laser slide in a plane, which is defined by a x-coordinate and a y-coordinate, so that the laser can be moved into a particular position according to the data. In order to obtain a particular depth structure, furthermore, the data (z-coordinate) is being used for continuously changing the depth focusing of the laser beam, so that the formation of high and low portions can be achieved according to the selected surface structure. Thus, there is the option to partially remove the surface with a laser, and to do this with continuously high precision with a very good resolution in the x and in the y direction of the plane, and also in elevation (z-coordinate). The method according to the invention can thus provide a coarse structuring of the surface, but it can also provide a fine structuring of the surface, so that an etching process can be omitted, and an etching process only has to be performed for example when the provided edges and ridges have to be rounded additionally.

Another essential advantage is provided in that the surfaces are reproducible any numbers of times based on the digitized data without complex control measures, which limits the monitoring activities of operators to a minimum.

Another advantage is omitting complex and environmentally detrimental etching processes.

In order to speed up the surface treatment, thus plural lasers can be used for processing in a first coordinate direction in a plane, wherein the lasers are jointly moved forward in the direction of a second coordinate in the plane. This facilitates a significant reduction of the processing time for large format press plates and endless belts. However, for embossing rollers, it suffices to arrange optionally several lasers along the direction of the longitudinal axis of the laser.

As a function of the laser used, and the power of the laser derived there from, a focusing of the laser beam can be performed up to a depth of 250 μm relative to the surface. Typically, a depth structuring of 100 μm suffices for the press plates, endless belts and embossing rollers. A respectively high pulse frequency of the laser beam thus facilitates a continuous process providing partial removal of the surface layer without interruption, wherein directing the laser beam can be performed through laser optics with a high speed of adjustment which reduces processing time.

In another embodiment of the invention it is provided that the focusing of the at least one laser is readjusted as a function of a provided distance change between a surface and laser optics. Typically, the press plates or endless belts to be treated are placed on a treatment device, which due to the size of approximately 2.3 meters in width and 6 meters in length can lead to minor deviations over the entire surface. Thus, through simultaneous measurement of the distance between laser optics and surface, a continuous compensation can be performed with respect to the focusing to be provided. This measure assures that the structure can be implemented with high precision also for possible minor unevenness of the press plate or endless belt to be processed. In this context, it has proven to be particularly advantageous that the laser beam or the laser beams contact the surface at an angle relative to vertical (z-coordinate), so that precise processing of the created depth structure is assured. Similar advantages can also be achieved when processing embossing rollers, wherein the distance change results from the camber provided and the distance change can be taken into consideration.

Thus, focusing the laser beam is performed with a diameter of 2-10 nm, wherein typically a fiber laser with energy of 50-500 W, advantageously 10-100 W, particularly advantageously 20-40 W, is being used. A pulsed fiber laser with a power of 20-40 W, a wavelength of 532 or 1,064 nm and pulse energy of 1 mJ at pulse duration of 100 ns and a frequency of 20-80 kHz has proven to be particularly advantageous. The laser facilitates continuous surface removal in a precise manner and simultaneously facilitates quick laser beam control without creating intolerable imaging errors in the surface or degrading processing speed.

The lasers used for processing include a laser assembly with a beam spreader and a focusing device. Initially, the beam exiting from the laser is fanned through the beam spreader, and subsequently focused anew through the focusing device, so that a controlled processing can be performed with respect to surface extension and also with respect to depth. The method of initially spreading the beam and subsequently focusing it thus has proven to be particularly useful, because it facilitates covering larger surface areas and depths with a fixed laser position.

When higher energy lasers are being used, a laser power reducer can be additionally provided in a laser assembly of this type, wherein the power reducer is disposed between the laser and the beam spreader, so that the laser beam can be power reduced as desired before the laser beam impacts the surface after passing the beam spreader and the focusing device. This measure facilitates reducing the laser energy to the desired amount which has proven optimal for processing.

The focusing device used for the laser assembly is thus disposed at a distance of 10-100 cm from the surface, wherein a greater surface can be covered by the laser beam with an identical focusing device and stationary arrangement of the laser, when the distance is greater. Irrespective of only one laser being used or possibly plural lasers being used, they can only respectively cover a portion of the surface, so that it is necessary to either move the laser assembly relative to the work piece to be processed, in this case a press plate or an endless belt, or possibly to move the work piece itself for a stationary position of the laser assembly. This provides the option to process plural portions sequentially in order to facilitate a large surface structuring of an endless belt or of a press plate. As recited supra, the surface portion thus selectable is in particular a function of the height of the focusing device over the surface, so that an optimization of the laser can be performed after a particular distance has been set, wherein the surface area of a portion of this type is defined by the focusing device.

Therefore, it is required to divide the entire surface of a press plate with a dimension of approximately 2.3 m in width and approximately 6 m in length or of an endless belt into a plurality of portions, which are independent of a possible pattern repeat of the surface structure. Each of the portions can thus be sequentially processed by a laser or plural lasers are being used and thus plural partial portions can be processed simultaneously. For this process, a fixed position of the laser assembly is selected, and the respective portion is scanned with the focusing device, wherein the digitized data of 3D topography is being used and the x-coordinate and y-coordinate of a portion of this type is filtered from digitized data and used for controlling the focusing device. Thus, the selected portion can be completely covered through the x-coordinates and the y-coordinates, wherein subsequent portions are approached accordingly in the same manner. The elevation structure is accordingly provided through changing the depth focusing, so that also imaging the z-coordinate is possible according to the captured surface structure. The partial portions thus defined as a function of the height of the laser optics and of the laser employed can have an edge length of 10 to 800 cm, advantageously 50 to 500 cm. Each of these predetermined portions is thus processed with a laser and laser optics associated therewith, wherein in particular cases, a single laser can process all predetermined portions sequentially. Alternatively, plural lasers can be used in one coordinate direction and possibly additionally offset in a multiple assembly in the same coordinate direction.

In order to avoid problems in the boundary portions of the respective portions, wherein the problems can occur for example due to imprecision in the support of the press plate or in the support of the slide of the laser assembly, it is furthermore provided not to align the portions at right angles relative to one another, but to provide them with curved boundary portions, which are advantageously optimized, so that this portion of the surface of the press plate or the endless belt contacts surface portions which are not processed by the laser at all or only processed minimally. Thus, possible edge problems in the boundary portions can be prevented, which leads to a detailed true reproduction of the surface structure. This method is always desirable when large structures shall be processed which extend over an essential portion of the press plate or endless belt and which have to be divided into different particular portions.

In another embodiment of the invention it is provided that measurement points are provided on the surface, which facilitate continuous control of the laser and/or focusing device position, so that adapting and correcting of the laser beam is facilitated through the control device. The measurement points provided on the surface can be detected through an auxiliary laser or another position measuring method and can be used for correcting the laser beam orientation. Thus there is the option to perform ongoing corrections of the laser beam also for large format press plates, endless bands and embossing rollers and to maintain an exact position also over a large surface area.

Advantageously digitized data of the a surface structure is used for the method according to the invention, wherein the digitized data replicates naturally grown materials like, for example, wooden surfaces or natural minerals like, for example, natural stone surfaces or artificially produced structures, like, for example, ceramic surfaces. Thus, there is the option to cast the surface structures from the respective materials and to transpose them into digitized data, so that the data can be fed to a laser control.

A 3D scanner is proposed to detect the surface structures, wherein the 3D scanner generates the digitized data, wherein in a first embodiment the entire surface of the original can be detected accurately through a deflectable mirror or through scanning the entire surface with a laser beam deflected by at least one mirror and imaging the surface structure from the reflections thus obtained. Alternatively, grey scale images of a surface structure can be used, wherein the grey scale images can be used for computing digitized data for determining 3D topography. In this case scaling is performed for each grey scale value which includes specifying the surface level and a minimum depth to be provided, so that a 3D topography can already be generated based on the grey scale images, wherein the 3D topography is converted into digitized data which in turn is used for controlling the laser control. The data thus generated may be converted into another data format, wherein the plurality of data can be reduced accordingly through interpolation and data reduction, so that the control of the focusing device can be optimized. In as far as grey scale images can be used; they can be generated by an image receiver e.g. a digital camera, wherein an 8 Bit-Map of the grey scale image is subsequently obtained by removing the image noise through manual or computerized post processing.

The method according to the invention is complemented in that the press plates, endless bands or embossing rollers are subjected to a pretreatment which can be mechanical cleaning and a cleaning with isopropanol ethanol or alcohol. Furthermore a treatment can be performed with a primer, for example a silyl compound, in order to obtain a particularly clean surface which can be subsequently processed with the laser beam. Furthermore there is the option to subject the surface of the press plate, endless belt or embossing roller to a chemical pretreatment before processing it with a laser beam, so that reflections are avoided.

After the structuring of the press plates, endless bands or embossing rollers has been performed they can be provided with one or plural coatings for post treatment. For example, the press plates, endless bands or embossing rollers can be chromed on their entire surface, advantageously hard chromed or coated with diamond type carbon or titanium boride, so that a long service life of press plates, endless bands or embossing rollers is obtained. In special processes a desirable gloss grade of the surface can be obtained through additional measures by finishing the chromed surface, for example through mechanical polishing, sand blasting or similar methods or additional layers, in particular chromium can be applied which provide different gloss grades.

Treating the press plates, endless bands or embossing rollers can thus be performed approximately in a horizontal position, but also in a vertical position depending on which laser assembly shall be used and which processing method is considered an advantageous procedure.

In order to perform a method according to the invention furthermore a device is proposed which includes a support device for the materials to be processed, at least one laser with beam spreader and focusing device and a slide support for moving the laser assembly into any position within a plane established by a x-coordinate and a y-coordinate and independent drive elements for moving to the position and a control unit which is provided for moving the laser optics to a position and for focusing the laser optics, so that a laser beam can be precisely directed onto the surface of the press plate or of the endless belt and can generate a reproduction of the surface structure according to the predetermined 3D topography.

Thus, the device according to the invention can be provided with plural laser assemblies, which in particular are comprised of at least one laser with a beam expansion and focusing device and which are disposed in one coordinate direction in a plane. These laser assemblies can thus be used for processing a press plate or an endless band in a coordinate direction of a plane and can be moved jointly in another coordinate direction of the plane, so that processing the entire surface is facilitated. In order to accelerate the method additional laser assemblies can be disposed offset from one another, wherein the laser assemblies are operated in parallel.

Thus the focusing device of each laser is disposed at a distance of 10 to 100 cm relative to the surface and can thus scan a surface with an edge length of 10 to 800 cm, advantageously 50 to 500 cm through the focusing device. This provides an option to move all laser assemblies or possibly only a single laser assembly into a fixed position relative to the press plate or the endless belt and to subsequently perform a processing of the partial portion provided. After completing this processing, the entire laser assembly can be moved step by step until the entire surface of the press plate or endless band has been processed. The more laser assemblies are used for processing the surface the more efficiently the surface processing method can be performed, wherein it is desirable to disposed one or plural laser assemblies in a coordinate direction and to move them step by step into the other coordinate direction.

In order to avoid unevenness of the applied press plate or endless band, a plurality of partial surfaces is configured on the support surfaces, wherein suction openings for a vacuum suction device are provided within the partial surfaces. Thus, the press plates can be suctioned through the suction openings and lead to an optimum stop and to a fixation of the respective position, wherein it is simultaneously assured that possible unevenness of the press plates or endless bands can be compensated leaving only minor deviations. Where minor deviations are provided, they can be detected and compensated through a distance control relative to the surface and a respective control of the focusing device. Thus, for processing it is provided that the press plates or the endless bands are processed in a horizontal or vertical position and supported in this planar position through the vacuum suction device. The work table thus employed consequently has a surface ground flat in order to exclude possible imprecision in elevation right from the beginning.

Eventually, the present invention relates to using a press plate, endless band or cylindrical embossing roller produced according to the method according to the invention and using the device according to the invention for compressing and/or embossing material plates with structured surfaces which require a precise structure.

BRIEF DESCRIPTION OF THE DRAWINGS

The invention is subsequently described in more detail with reference to an embodiment and a device for performing the method according to the invention and is described with reference to drawing figures, wherein.

DETAILED DESCRIPTION OF THE INVENTION

Figure 1:
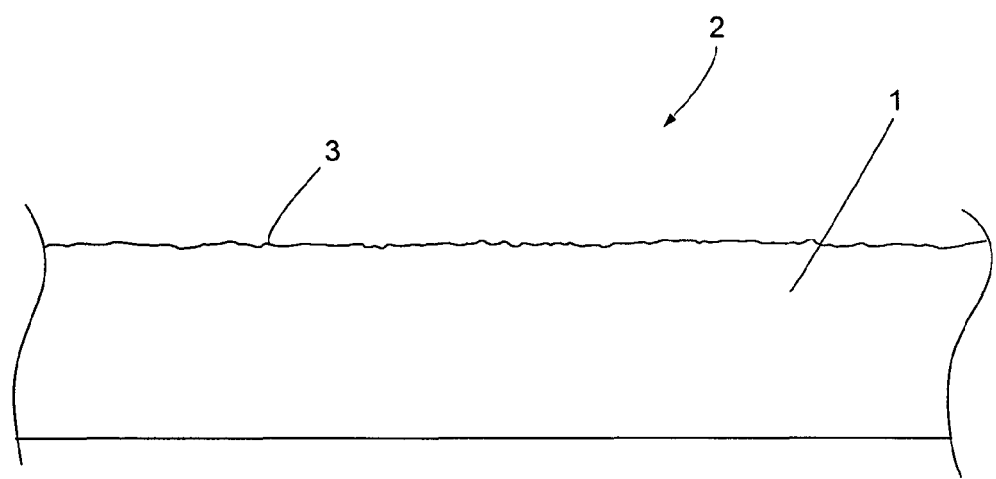
FIG. 1 illustrates a non processed press plate in a cross sectional view.
Figure 2:
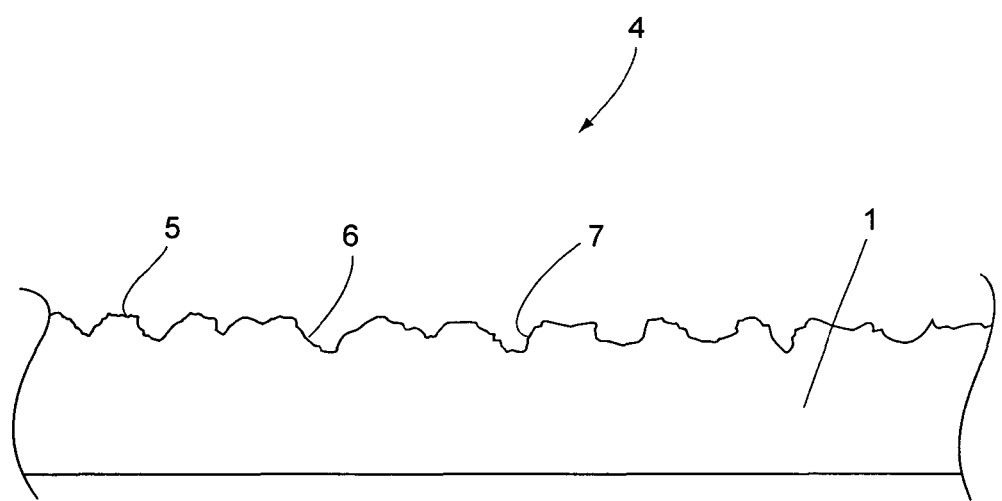
FIG. 2 illustrates a structured press plate processed by a laser beam in a cross sectional view.

FIG. 1 illustrates a press plate 1 partial cross sectional view, wherein the press plate is typically made from metal. The surface 2 to be processed includes a surface roughness 3 before processing, wherein the surface roughness is typical for the manufacturing process. After pre cleaning of the press plate 1 has been performed, a surface structure 4 is generated through the laser method according to the invention, wherein the surface structure is characterized by high portions 5 and low portions 6 according to FIG. 2. The high portions 5 and also the low portions 6 furthermore include fine structuring 7. The entire structuring of the surface of the press plate 1 is thus generated through the laser method according to the invention, wherein a depth focusing of the laser beam is performed through respective controlling of the focusing device (laser optics). Furthermore, a detection of a particular portion of the press plate is performed through the focusing device in order to perform the processing before a movement of the laser assembly can be performed relative to the press plate 1. Thus, FIG. 2 illustrates a fine structuring 7 and a coarse structuring which were illustrated schematically for the purpose of clarity, wherein however it has to be presumed that the depth profile is configured in a dimensional range of up to 250 µm, advantageously 100 µm.

Figure 3:
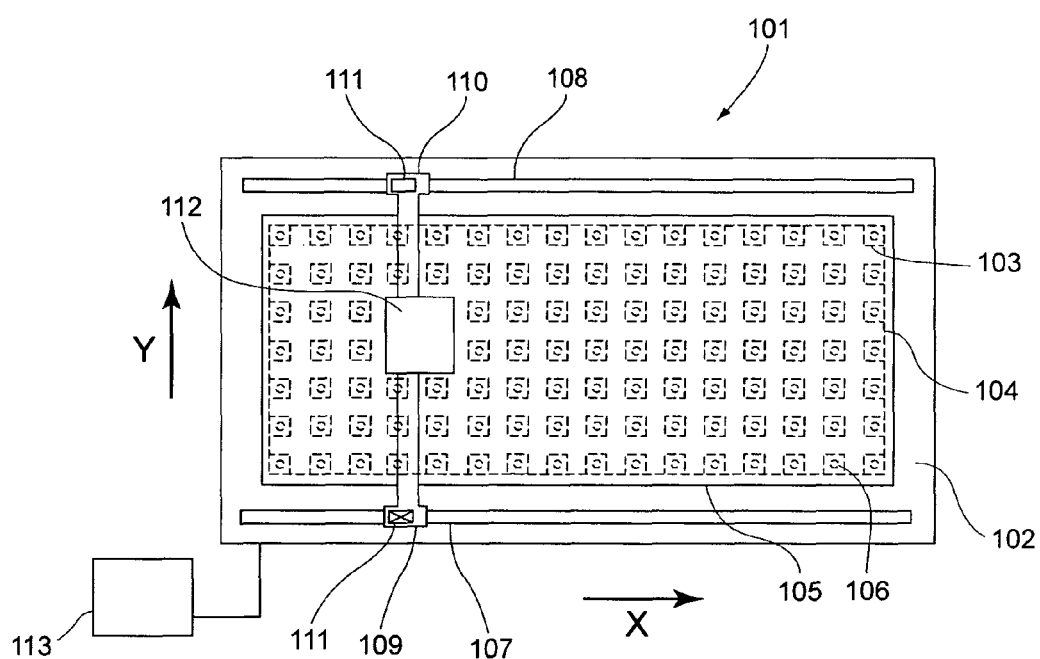
FIG. 3 illustrates a device for performing the method according to the invention in a lateral view.

FIG. 3 illustrates a top view of a device 101 for performing a method according to the invention. The device includes a support table 102 with a contact surface 104 made from a plurality of particular planar surfaces 103, wherein a press plate 105 is supported on the support surface. A respective suction opening 106 is respectively configured in the planar surfaces 103, wherein the suction opening 106 pulls the press plate 105 onto the planar surfaces 103 through a vacuum pump which is not shown and thus assures a non moveable position of the press plate 105 during the entire processing operation.

Figure 4:
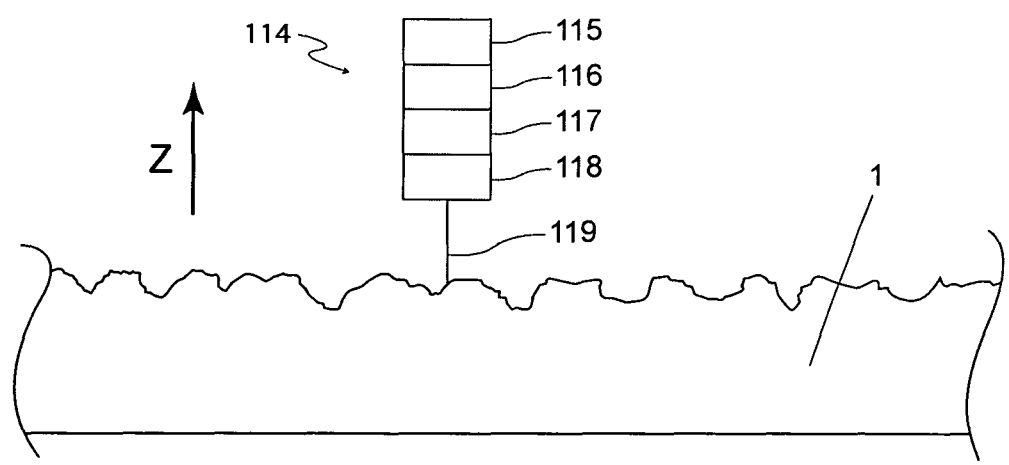
FIG. 4 illustrates the laser assembly in a lateral view.

FIG. 4 illustrates the laser assembly 114 including the laser 115, the power reducer 116, the beam spreader 117, the focusing device 118 and the laser beam 119 in a lateral view.

In the illustrated embodiment the device 101 is disposed in a horizontal position; however, there is the option to dispose the device in a vertical position or in a position that is inclined relative to the vertical position in order to perform the processing of the press plate 105. Support rails 107, 108 are configured along the longest extension of the press plate 105, wherein sliding supports 109, 110 are moveable along the support rails and thus through a drive motor 111, 112, wherein the sliding supports are controlled through a control device 113, advantageously a computerized control device. A laser assembly is moved in a direction of the x-axis and the y-axis through the drive motors 111, 112. The laser assembly 114 includes a laser 115, a beam spreader 117 and a focusing device 118, wherein possibly depending on the type of laser an additional laser power reducer 116 can be used. Through the laser assembly or possibly a plurality of lasers in a coordinate direction, wherein the lasers are disposed adjacent to one another, a processing of the surface of the press plate 105 can be performed. In order to accelerated the method thus plural laser assemblies can be disposed in line, this means in one coordinate direction, possibly in a predefined distance from this lineup, wherein the laser assemblies can respectively simultaneously process their respective portions of the press plate 105, so that an optimization can be performed with respective shortening of the processing time.

REFERENCE NUMERALS AND DESIGNATIONS 1 press plate
2 surface
3 surface roughness
4 surface structure
5 high portion
6 low portion
7 fine structuring
101 device
102 support table
103 planar surface
104 support table
105 press plate
107 support rail
108 support rail
109 sliding support
110 sliding support
111 drive motor
112 drive motor
113 control device
114 laser assembly
115 laser
116 power reducer
117 beam spreader
118 focusing device
119 laser beam

What is claimed is:

1. A method for producing a three dimensional surface structure for a metallic press plate or endless belt comprising the following steps:
    holding the metallic press plate or endless belt in place on a support table with a contact surface made up of a two-dimensional array of planar surfaces, said planar surfaces each including a suction opening to apply a vacuum to provide an optimum stop and fixation, and with sliding supports on support rails controlled by a control device,
    detecting and providing compensation for the metallic press plate or endless belt held in place with the vacuum when there are residual minor deviations in evenness via a distance control relative to the surface and a respective control of a focusing device,
    providing and using digitized data of a three dimensional topography of a scanned surface structure, wherein the digitized data includes a x-coordinate, a y-coordinate and a vertical z-coordinate:
    using the x-coordinate and the y-coordinate of the digitized data for position control of a focus of at least one material removing laser in a plane defined by the x-coordinate and the y-coordinate;
    using the vertical z-coordinate for controlling a depth focusing of a beam of the at least one material removing laser;
    partially removing a surface of the metallic press plate or endless belt through the beam of the at least one material removing laser using the vertical z-coordinate for controlling the depth focusing of the beam in order to reproduce a predetermined three dimensional surface structure; and
    continuously adjusting the depth focusing of the beam of the at least one material removing laser through controlling a focusing device as a function of a measured distance between the surface and optics of the at least one material removing laser.

2. The method according to claim 1, further comprising: using plural material removing lasers for processing in a first coordinate direction in the plane and moving the plural material removing lasers jointly in a second coordinate direction.

3. The method according to claim 1, comprising:
    focusing the at least one material removing laser at a depth of up to 250 pm relative to the surface.

4. The method for producing a surface structure according to claim 1, wherein the at least one material removing laser impacts the surface at an angle relative to the vertical z-coordinate.

5. The method according to claim 1, further comprising: focusing the beam of the at least one material removing laser to a diameter of 2 to 10 µm.

6. The method according to claim 1, further comprising: using a material removing fiber laser with an energy of 5 to 500 W.

7. The method according to claim 1, further comprising: using a pulsed material removing fiber laser with a power of 20 to 40 W, a wave length of 532 to 1064 nm and a pulse energy of 1 mJ at a pulse duration of 100 ns and a repeat frequency of 20 to 80 kHz.

8. The method according to claim 1, further comprising: using a laser assembly including the at least one material removing laser, a beam spreader and the focusing device.

9. The method according to claim 1, further comprising: reducing an energy of the at least one material removing laser through a laser power reducer.

10. The method according to claim 1, further comprising: disposing optics of the at least one material removing laser at a distance of 10 to 100 cm from the surface.

11. The method according to claim 1, further comprising: dividing the surface structure into portions irrespective of a repeat pattern, wherein the portions are respectively sequentially processed by the material removing laser or at least partially processed by plural material removing lasers in parallel.

12. The method according to claim 11, further comprising: freely selecting boundaries of the portions, defining them so that the boundaries coincide with areas of the surface not to be processed.

13. The method according to claim 12, wherein the boundaries of the portions have an edge length of 10 to 800 cm as a function of the material removing laser employed.

14. The method according to claim 13, wherein the boundaries of the portions are being processed with a material removing laser and associated laser optics.

15. The method according to claim 1, wherein measurement points are provided on the surface which facilitate a control of the position of the material removing laser or focusing device at any time, so that corrective control can be performed.

16. The method according to claim 1, further comprising: using digitized data of surface structures which replicates surfaces of naturally grown raw materials, natural minerals, or artificially produced structures.

17. The method according to claim 1, further comprising:
    using a 3D-scanner to capture digitized data,
    wherein the 3D-scanner accurately detects an entire surface of an original through deflectable mirrors or detects it through scanning the entire surface structure with a laser beam deflected by at least one mirror and by detecting reflections thus obtained, or by using grey scale images of a surface structure for computing digitized data for defining a 3D-topography.

18. The method according to claim 1, further comprising: converting detected digital data through interpolation and data reduction for controlling the optics of the material removing laser.

19. A device for using the method according to claim 1, comprising:
    a support table with a contact surface made up of a two-dimensional array of planar surfaces, said planar surfaces each including a suction opening to apply a vacuum to provide an optimum stop and fixation, and with sliding supports on support rails controlled by a control device,
    at least one material removing laser with a beam spreader and a focusing device;
    a slide support for moving a laser assembly into any position within a plane defined by a x-coordinate and a y-coordinate; and
    independent drive elements for moving to a position, and a control unit provided for moving optics of the at least one material removing laser to a position and depth focusing the optics of the at least one material removing laser through controlling the focusing device.

20. A device for using the method according to claim 1, comprising:
    one or plural laser assemblies including a material removing laser with a beam spreader and a depth focusing device, wherein the one or plural laser assemblies are arranged in a first coordinate direction in the plane and are jointly movable in a second coordinate direction in the plane.

21. A device for using the method according to claim 1, comprising: the depth a focusing device disposed at a distance of 10 to 100 cm from the surface and detecting an area with an edge length of 10 to 800 cm.

22. A method comprising the step:
using a press plate or endless belt produced according to claim 1 for pressing or embossing material plates to form a structured surface.

23. The method according to claim 1, further comprising:
prior to the partially removing the surface, chemical pre-treating the surface to avoid reflection of the at least one material removing laser.

* * * * *